United States Patent
Ingraham

(10) Patent No.: US 6,589,008 B1
(45) Date of Patent: Jul. 8, 2003

(54) CONTAINER HANDLING DEVICE AND METHOD

(75) Inventor: Thomas M. Ingraham, Fort Collins, CO (US)

(73) Assignee: Advanced Manufacturing Technology, Fort Collins, CO (US)

( * ) Notice: Subject to any disclaimer, the term of this patent is extended or adjusted under 35 U.S.C. 154(b) by 0 days.

(21) Appl. No.: 09/969,484

(22) Filed: Oct. 2, 2001

(51) Int. Cl.[7] ............................................. B65G 57/22
(52) U.S. Cl. ................. 414/791.7; 414/791.6; 414/792.6; 414/792.9; 198/468.3
(58) Field of Search ................... 414/791.6, 791.7, 414/792.6, 792.9, 791.2; 406/88; 198/468.3; 294/90, 118, 119

(56) References Cited

U.S. PATENT DOCUMENTS

| | | | |
|---|---|---|---|
| 2,634,167 A | * | 4/1953 | Lovebridge .................. 300/21 |
| 2,799,414 A | * | 7/1957 | Streckfuss .................. 214/309 |
| 3,897,877 A | * | 8/1975 | Vandermeer et al. ....... 214/6 P |
| 3,918,598 A | | 11/1975 | VanderMeer et al. |
| 4,154,347 A | | 5/1979 | Vander Meer et al. |
| 4,406,359 A | | 9/1983 | Cole et al. |
| 4,747,252 A | | 5/1988 | Kapke |
| 4,829,743 A | | 5/1989 | Kapke |
| 4,829,744 A | | 5/1989 | Kapke |
| 4,887,719 A | | 12/1989 | Kapke |
| 4,934,508 A | | 6/1990 | Vander Meer et al. |
| 4,990,034 A | | 2/1991 | Kapke et al. |
| 5,206,039 A | * | 4/1993 | Valyi .......................... 425/526 |
| 5,271,709 A | | 12/1993 | VanderMeer et al. |
| 5,273,152 A | * | 12/1993 | Brun ....................... 198/468.3 |
| 5,320,457 A | | 6/1994 | VanderMeer et al. |
| 5,437,533 A | | 8/1995 | VanderMeer et al. |
| 5,501,552 A | | 3/1996 | Simkowski |
| 5,501,553 A | | 3/1996 | Simkowski |
| 5,522,692 A | | 6/1996 | Simkowski |
| 5,570,977 A | | 11/1996 | Simkowski et al. |
| 5,630,679 A | | 5/1997 | Simkowski et al. |
| 5,716,189 A | | 2/1998 | Winski et al. |
| 5,842,818 A | | 12/1998 | Simkowski |
| 6,000,884 A | | 12/1999 | Ingraham |
| 6,196,788 B1 | * | 3/2001 | Talbot et al. ................ 414/802 |
| 6,431,817 B1 | * | 8/2002 | Simkowski .............. 414/796.9 |

* cited by examiner

Primary Examiner—Eileen D. Lillis
Assistant Examiner—Michael Lowe
(74) Attorney, Agent, or Firm—Harness, Dickey & Pierce, P.L.C.

(57) ABSTRACT

An apparatus and method for packaging containers, of the type having an engagement lip, wherein the apparatus includes tacks to engage the engagement lip to move the containers from starting point to a delivery point. The containers are moved by the apparatus while being engaged by the track such that the containers are never free from the track until loaded on a pallet. A set of the containers is constricted into a bundle and the bundle is then resquared and set on a pallet. One a pallet includes a sufficient number of bundles the pallet is bound for shipment or storage.

19 Claims, 8 Drawing Sheets

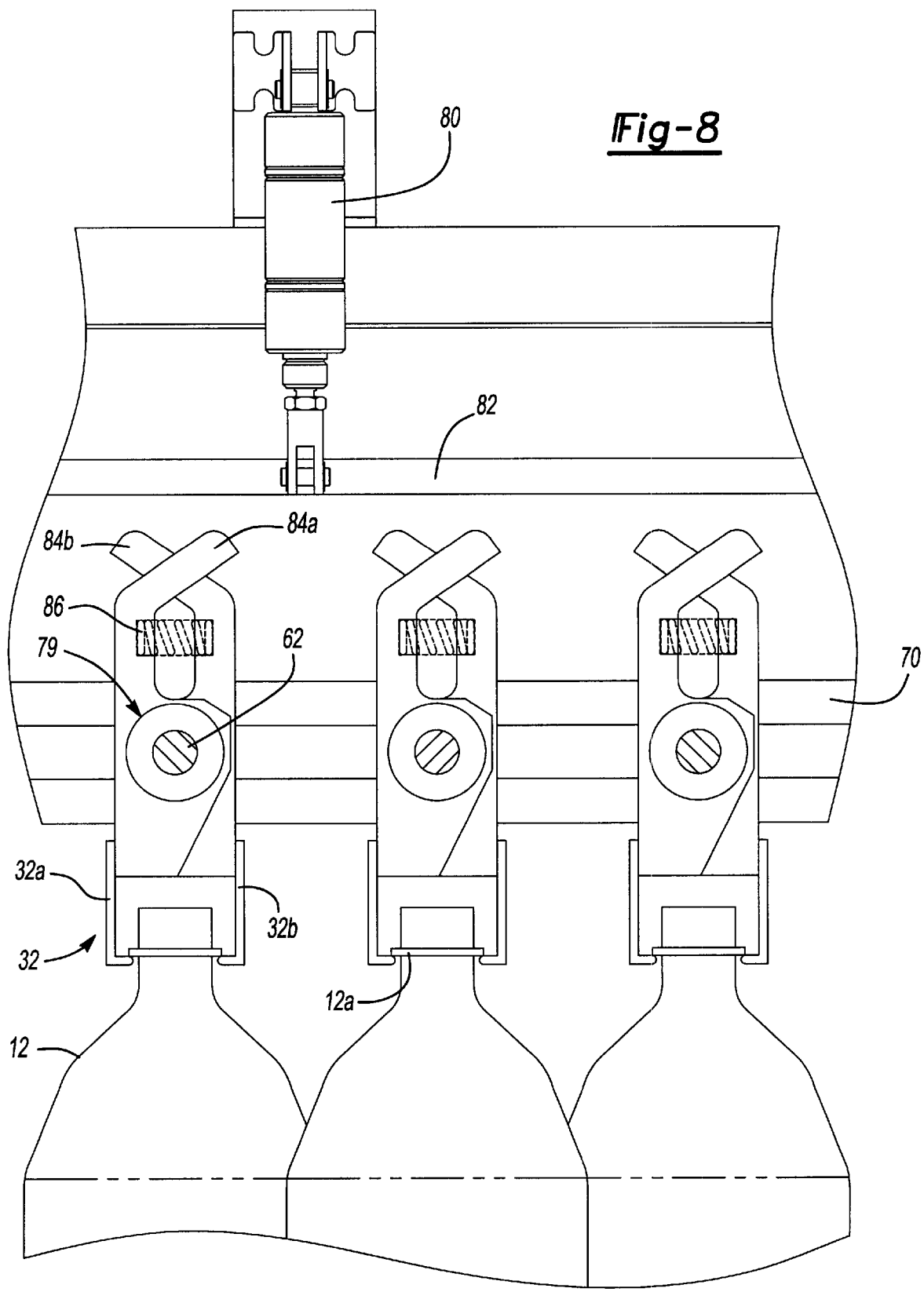

CONTAINER HANDLING DEVICE AND METHOD

FIELD OF THE INVENTION

The present invention relates to a container handling system and, more particularly, to a container handling system which stacks a predetermined number of containers in a predetermined configuration for shipping and reduces the need for operator involvement.

BACKGROUND OF THE INVENTION

Currently, various packaging and shipping methods are used to transport containers, such as bottles, from one location to another. Such methods include palletizing layers of vertically orientated bottles upon one another to form a shipping package, wherein the shipping package contains a predetermined number of bottles. Subsequently, the stacked layers of bottles are wrapped or otherwise secured to ensure that they withstand the harshness associated with shipping.

Due to inventory and cost, it is critical that the number of bottles shipped in each container is known and consistent. As such, feeding mechanisms have been devised which ensure that the shipping package contains a predetermined number of bottles. Such mechanisms typically have a conveyor on which a pre-selected number of bottles are loaded. The bottles are then transported along the conveyor and loaded onto a pallet.

One conventional method of palletizing bottles is to feed them in from the single lane conveyance onto an accumulation conveyor by use of a slow down module. In this way, the single lane of bottles is changed to a stream of either two wide or three wide, which then hit the back of a previously accumulated pack. When this happens, the stream spreads out over the entire width of the belt to the edges of the accumulator and are patterned. Once the bottles are patterned, a layer is swept onto a pallet. While this method does palletize bottles, it has several drawbacks. Specifically, as the bottles are flowing to the sides of the accumulator, they can either fall over, miss a spot (void), or jumble up such that they are out of pattern. In addition, when a layer is swept off, bottles may be crushed and destroyed. Overall, with these drawbacks an operator is required full time to watch the pattern, fill voids, and make corrections as required.

A second method of palletizing blow molded bottles is to separate the one single lane as described above into six single lanes with automatic divert gates. Once the proper number of bottles are counted, a bottle stop is closed and the six lanes of bottles are run into the sweep mechanism. The sweep mechanism sweeps as many times as it takes to form a complete layer. Once the layer is formed, then it is moved forward and stacked on the pallet. This method also has some drawbacks. Specifically, the bottles are unstable in the sweep mechanism and can tip over during the sweeping process. As a result, the machine is limited in speed and even at a low speed the sweep mechanism is unreliable and thereby requiring an operator. In addition, the entrance of high speed blow molders into the bottling market are too fast for this concept, thereby requiring multiple palletizing machines to be used. The present invention was developed in light of these and other disadvantages.

SUMMARY OF THE INVENTION

It is therefore an advantage of the present invention to provide a container material handling system and method which reduces the amount of container tippage during packaging.

It is yet another advantage of the present invention to provide a container material handling system which quickly and accurately selects and organizes a predetermined number of containers into a layer configuration for stacking.

Another advantage of the present invention is to eliminate the need for a human operator to ensure proper stacking and palletizing.

Yet another advantage of the present invention is the speed at which bottles may be patterned and placed onto a pallet.

An additional advantage of the present invention is that the bottles are held in place until they are palletized, thereby virtually eliminating the possibility of tipping which would destroy the pattern and certainty of the system.

To accomplish these and other advantages, the present invention provides a method and apparatus for packaging a plurality of containers, wherein each container has a body and an engagement lip surrounding a neck portion, which comprises a plurality of steps. First, a set of containers is provided. Next, the containers are loaded on a plurality of neck guides and driven along the neck guides to a gathering area to form a bundle of containers. The containers are patterned and closed into a "nesting" pattern bundle to provide the maximum number of containers per volume. A transfer device then stacks the bundle on a pallet where it is "resquared" to ensure maximum rigidity. In a further aspect of the present invention, the above steps are repeated for a plurality of sequential sets of containers and corresponding bundles until the proper shipping package size is achieved.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 8 is a detail view of the row opening cylinder and bar according to the present invention.

DETAILED DESCRIPTION OF THE PREFERRED EMBODIMENTS

Figure 1:
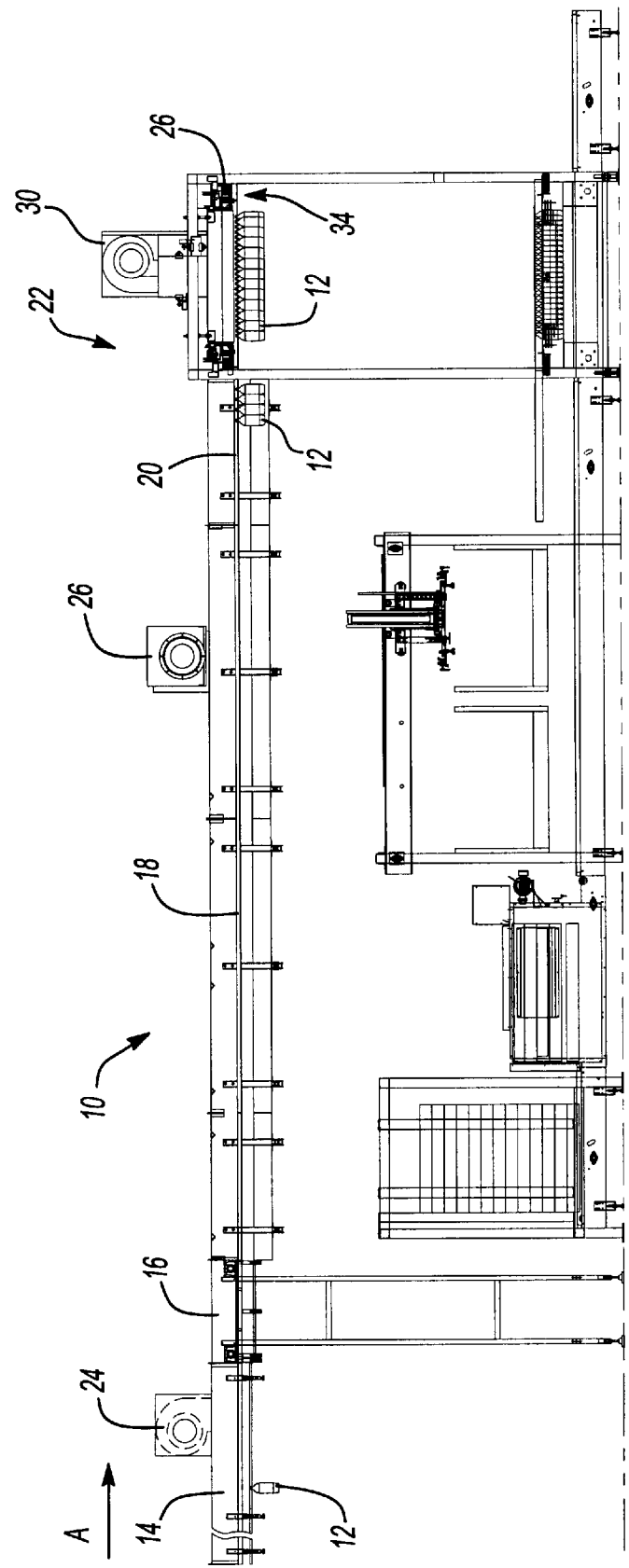
FIG. 1 is a side elevation view of an palletizing apparatus.
Figure 2:
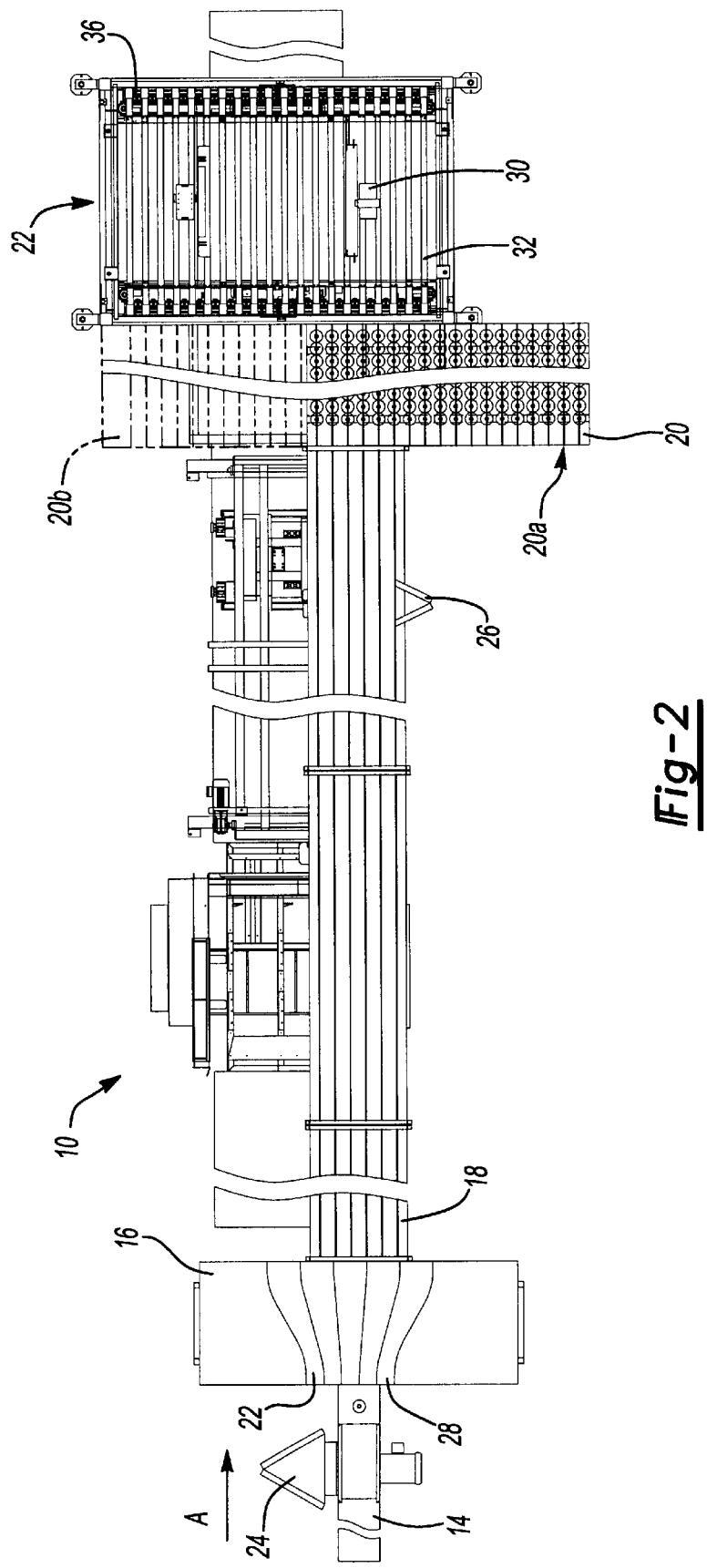
FIG. 2 is a top plan view of a palletizing apparatus.

With particular reference to FIGS. 1 and 2, a bottle or container palletizing apparatus is illustrated generally at 10.

Palletizing apparatus 10 is designed to move bottles or similarly formed containers 12 from a first position to a palletized position. The palletizing apparatus 10 includes several distinct sections to move the bottles 12 from the first position to the palletized position. With reference to FIG. 8 the bottles 12 are held in the neckguides by a lip 12a formed in an upper portion of the bottle 12. However, the bottle 12 is able to slide along the neckguide thus being able to move from position to position within the neckguide. Returning reference to FIGS. 1 and 2, generally, bottles 12 are moved in the direction of Arrow A from their initial position in the single lane neck guide 14 through a six lane former 16. Once the bottles 12 are through the six lane former 16, they continue down the six lane neck guide 18. At the end of the six lane neck guide 18, the bottles encounter an eighteen row indexer 20. After the bottles 12 have filled the eighteen row indexer 20, the bottles then move to the palletizing section 22.

A plurality of air plenum create a jet in the adjacent neckguide which pushes the bottle 12 through the neckguides. An air plenum 24 pushes the bottles 12 along the first single lane neck guide 14 towards the six lane former 16. A second air plenum 26 pushes the bottles through the six lane former 16 and to the six lane neck guide 18. The six lane former 16 includes internal passageways 28 and internal gates (not shown) which move the bottles from the single lane neck guide 14 to the six lane neck guide 18. The bottles 12 then travel along the six lane neck guide 18 toward the eighteen row indexer 20 under the force of the air plenum 26. The eighteen row indexer 20 is movable from a first position 20a to a second position 20b (shown in dashed lines). A final air plenum 30 assists in pushing the bottles 12 along the six lane neck guide 18 into the eighteen row indexer 20.

The eighteen row indexer 20 fills the first six rows and then indexes from the first position 20a towards the second position 20b to fill the next six rows and then indexes a final time to the 20b position to fill the final six rows. In this way, up to eighteen rows may be formed. However, it is to be understood that this is exemplary only and that more lanes may be included in the eighteen row indexer 20 or fewer than the entire eighteen rows may be filled with bottles 12. Once the eighteen row indexer 22 has been filled to the desired capacity, then the last air plenum 30 pushes the bottles from the eighteen row indexer 20 into the row closing neck guides 32.

Figure 3:
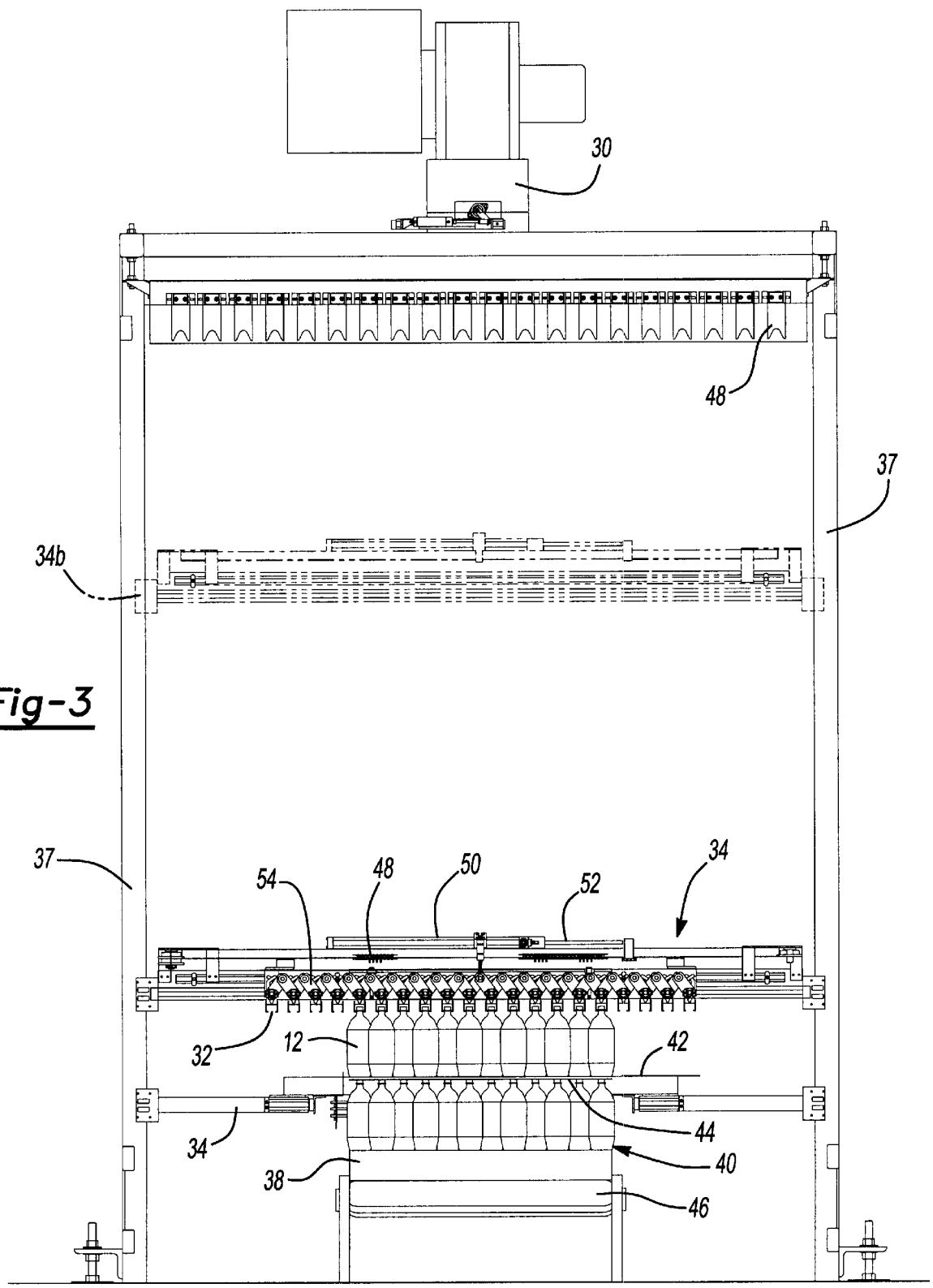
FIG. 3 is an end view of the palletizing section of the palletizing apparatus with the hoist in a lowered position according to the present invention.
Figure 4:
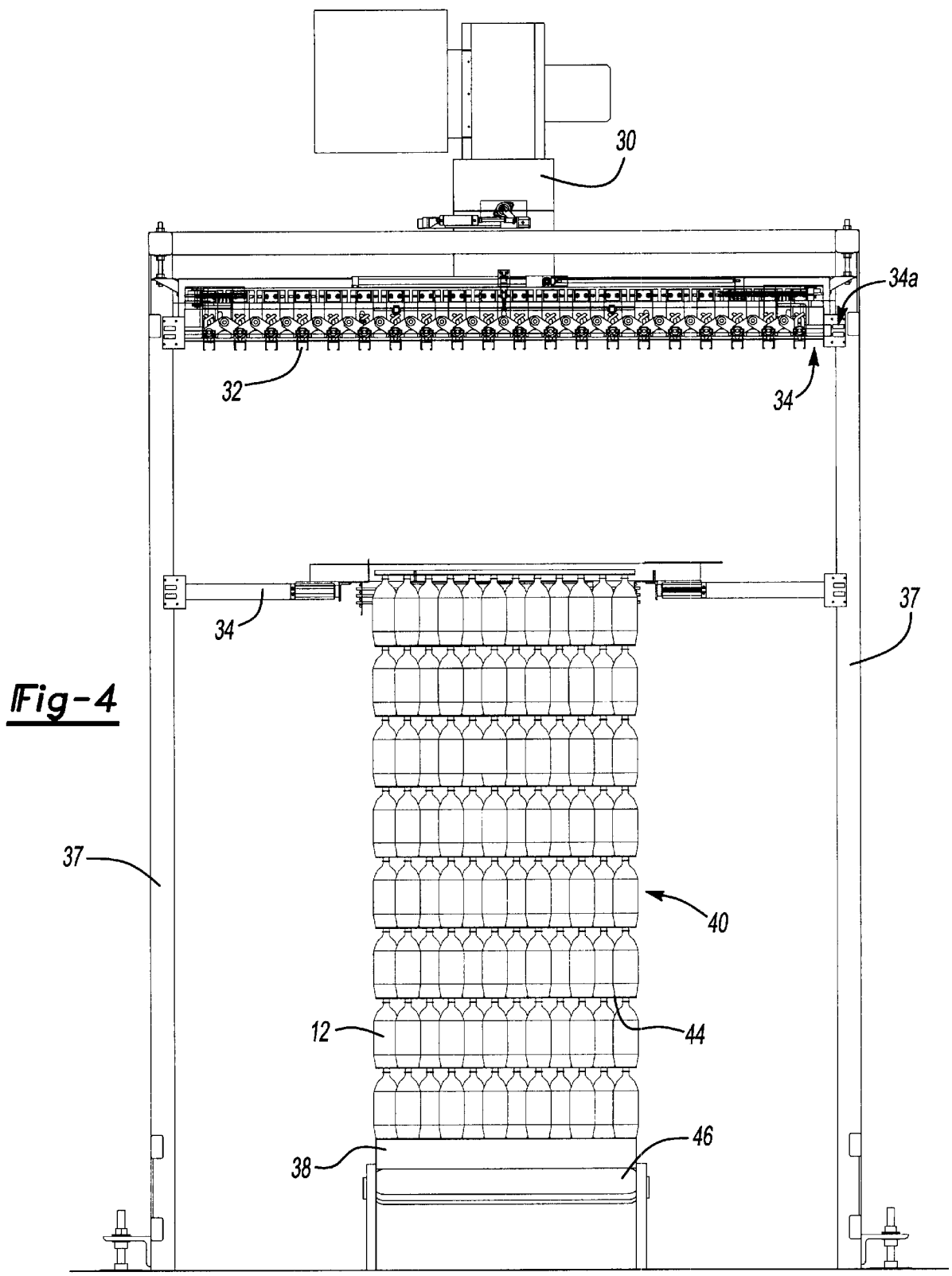
FIG. 4 is an end view of the palletizing section of the palletizing apparatus with the hoist in the fully up position according to the present invention.

Continuing reference to FIG. 1 and further reference to FIGS. 3 and 4, the palletizing section 22 of the palletizing apparatus 10 is in greater detail described. The hoist 34 generally includes a plurality of holding members or row closing neck guides 32 which engage the bottles 12. The bottles 12 from the eighteen row indexer 20 move into the row closing neck guides 32 of the hoist 34 where upon each row of bottles 12 engages a stop 36 to form a first nested pattern. The first nested pattern being where an individual bottle 12 is positioned between two other bottles such as one may stack logs of wood or other round objects. However, when the bottles first engage the stops 36, they are spaced a distance apart. After the bottles 12 have stopped in the row closing neck guides 32 of the hoist 34, the row closing neck guides 32 are actuated to compress the bottles. 12 together to form a constricted nested pattern wherein each bottle 12 is nearly touching the adjacent bottle 12. Once the row closing neck guides 32 have been closed (described herein), the hoist 34 then proceeds down the hoist guides 37 placing that layer of bottles 12 in the constricted nested pattern on a pallet 38. Each layer of bottles 12 is referenced as a bundle or tier 40 of bottles 12. Once a tier 40 has been placed upon a pallet 38, a resquare apparatus 42 constricts the tier 40 further to ensure that the tier 40 is as tightly packed as possible. The resquare apparatus 42 also places a tier sheet 44 on top of the tier 40. The process of forming, placing, and resquaring tiers 40 is repeated until a full pallet 38 is produced. A pallet 38 is considered full when a predetermined number of tiers 40 has been placed on the pallet 38 which takes into consideration the size and shape of bottles along with other factors. A full pallet 38 may be produced to resemble that illustrated particularly in FIG. 4. Once a full pallet 38 is produced, the pallet 38 is conveyed along the pallet conveyor 46 where it is bound and removed for shipping or storage.

Now with particular reference to FIGS. 3 and 4, the hoist 34 runs on the hoist guide tracks 37 and is movable from a top position 34a to a lowered position 34b, and may be lowered to a position substantially adjacent the pallet 38 (not shown). When the hoist 34 is in the fully upright position 34a, the hoist 34 engages fixed cams. The fixed cams 48 ensure that the row closing neck guides 32 return to a proper position to receive a new set of bottles 12 from the eighteen row indexer 20. The fixed cams 48 are necessary to ensure that the row closing neck guides 32 are in proper alignment with the neck guides in the eighteen row indexer 20 so that the bottles 12 will move easily into the row closing neck guides 32. The hoist 34 is preferably moved on the hoist guide tracks 37 with servo motors, however it is to be understood that any number of means may be used to move the hoist 34. After the bottles 12 have been moved into the row closing neck guide 32 of the hoist 34, the hoist 34 moves from the top position 34a, engaging the fixed cams 48, to an intermediate position 34b not engaging the fixed cams 48 so the row closing neck guides 32 may then be closed to form the tier 40 into the constricted nested pattern. The movement of the row closing neck guides 32 is actuated by a driving mechanism, preferably the driving mechanism is an air cylinder 50 that further actuates a first arm 52. The first arm 52 engages at least one end of the set of row closing neck guides 32. Each of the row closing neck guides 32 are interconnected to another row closing neck guide 32 through linkages 54, therefore movement in one of the row closing neck guides 32 creates movement in all of the row closing neck guides 32. Preferably the row closing neck guides 32 move towards the center most row closing neck guide 32 (process and apparatus described herein).

Figure 5A:
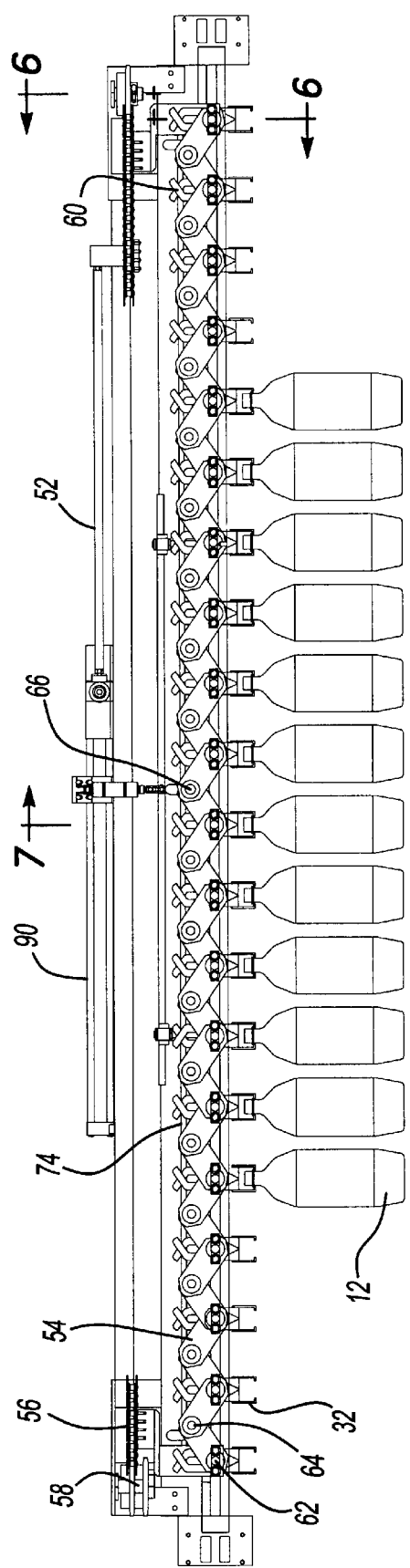
FIG. 5A is a detail view of the hoist from FIG. 3 in the uncollapsed position according to the present invention.
Figure 5B:
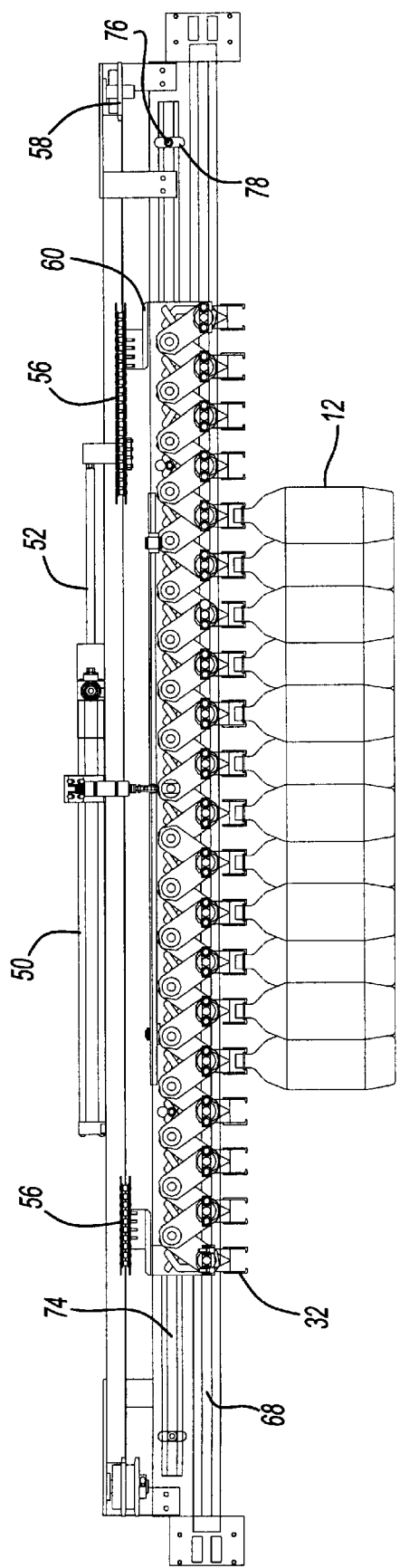
FIG. 5B is a detail view of the hoist from FIG. 4 in the collapsed position according to the present invention.

With particular reference to FIGS. 5A and 5B, the general construction of the hoist 34 including the row closing neck guides 32 is illustrated. In particular, FIGS. 5A and 5B, illustrate the hoist 34 and the row closing neck guides 32 as seen in direction of Arrow A as shown in FIG. 1. The row closing neck guides 32 as illustrates in FIG. 5A are in their fully extended position, that being a position which the row closing neck guides 32 and the hoist 34 are in the fully up position 34a and engaging the fixed cams 48 (illustrated in FIG. 3). The row closing neck guides 32 may then be moved more adjacent one another to form the constricted nested pattern with the bottles 12 to form a tier 40. The air cylinder 50 drives the first arm 52 which engages the chain linkages 56 to drive the chain linkages 56 in a chain guide 69 (shown in FIG. 6) around sprockets 58 to move the neck guide engaging arms 60 which in turn moves the row closing neck guides 32 which then constricts a tier 40 into the constricted nested pattern as illustrated particularly in FIG. 5b.

Each row closing neck guide 32 is pivotally affixed to a first pivot guide 62, the first pivot guide 62 also engages a linkage 54. The linkage 54 is further pivotally affixed to an adjacent linkage 54 through a second pivot guide 64 wherein the linkages 54 generally form a V or W pattern along the entire length of the hoist 34. When the first arm 52 is actuated by the air cylinder 50, the chain linkages 56 move the neck guide engaging arm 60 which in turn drives the row closing neck guides 32 towards the center. As this happens the individual linkages 54 collapse towards the fixed center 66.

Figure 6:
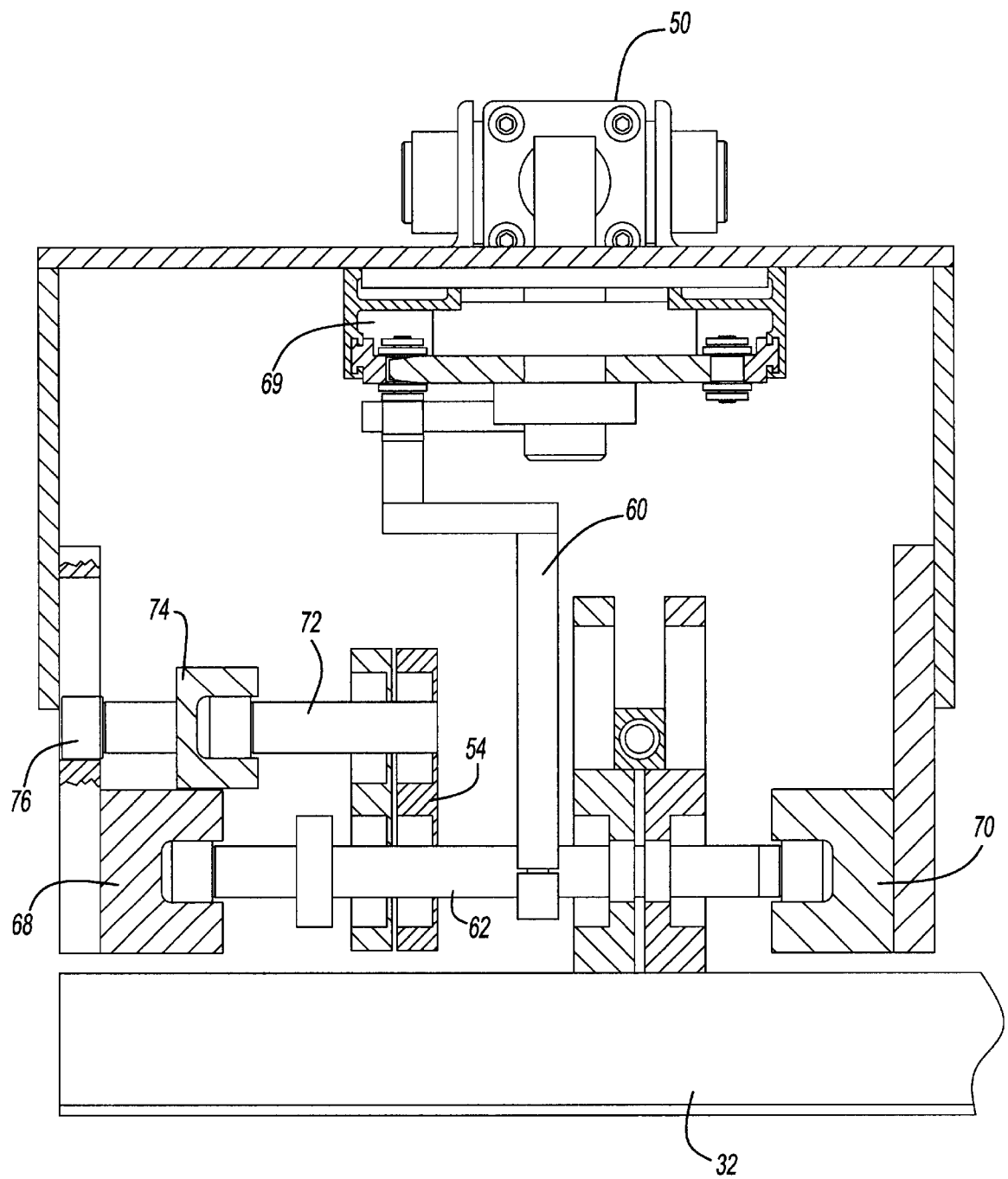
FIG. 6 is a cross-section view of the hoist taken along line 6—6 of FIG. 5A.
Figure 7:
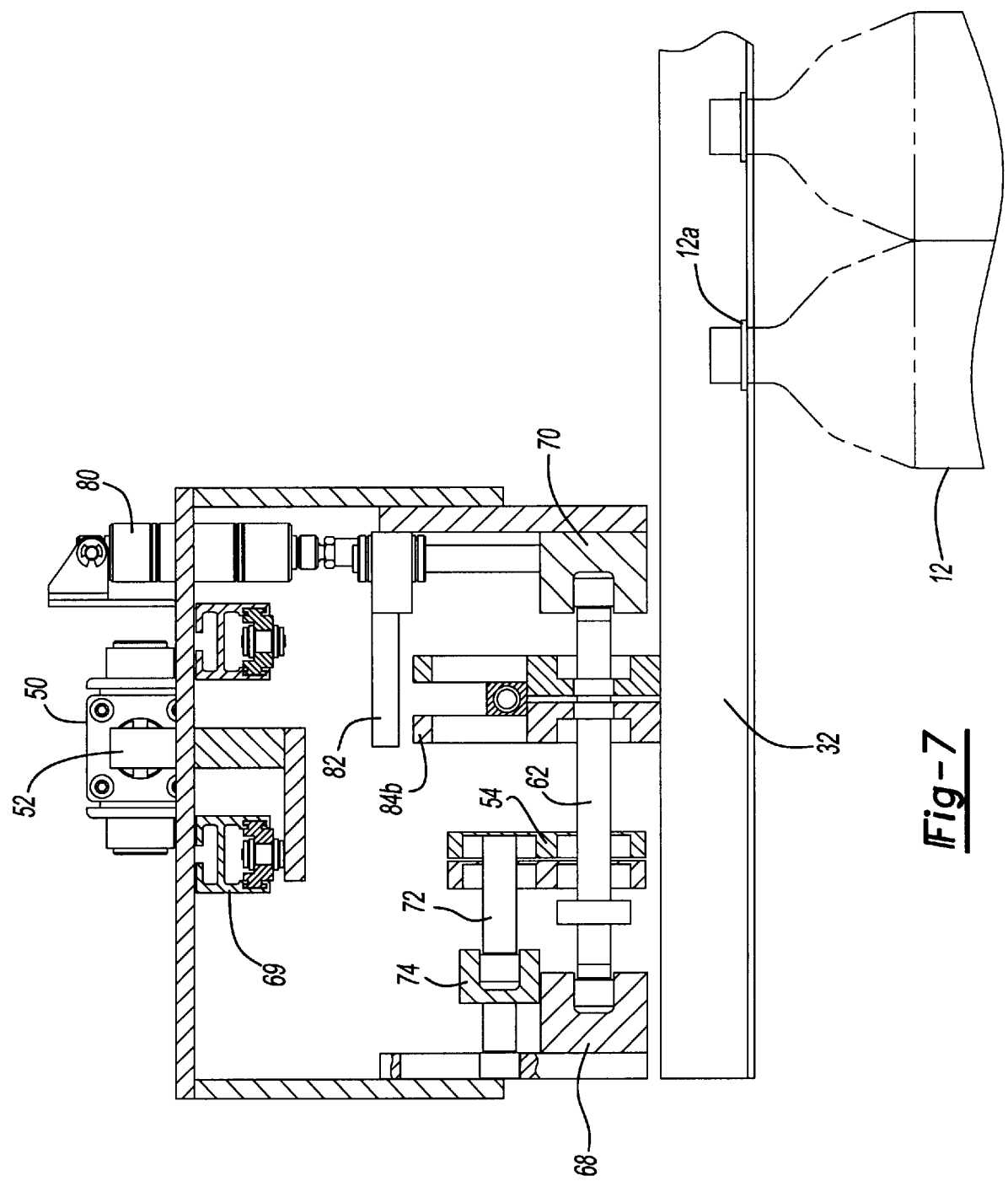
FIG. 7 is a cross-sectional view of the hoist taken along line 7—7 of FIG. 5A.

With continuing reference to FIGS. 5A and 5B, and further reference to FIG. 6, the action of moving the row closing neck guides 32 towards the fixed center point 66 is described in detail. The neck guide engaging arm 60 is affixed at a first end to the chain linkages 56 in the chain guide 69 and a second end the neck guide engaging arm 60 is affixed to the first pivot guide 62. The first pivot guide 62 is also affixed to the row closing neck guides 32. The first pivot guide 62 further engages a first lower track 68 on a first side of the hoist 34 and a second lower track 70 on a second side and opposite side of the hoist 34. Therefore, when the air cylinder 50 is actuated to drive the neck guide engaging arm 60 towards the fixed center point 66, the neck guide engaging arm 60 moves the first pivot guide 62 along the tracks 68 and 70 thereby moving the new closing neck guides 32 toward the fixed center point 66 by means of the linkages 56. The amount of movement of the first pivot guide 62 and the row closing neck guides 32 is limited through a second pivot guide 72 and an upper track 74. The second pivot guide 70 is interconnected to the first pivot guide 62 through the linkages 54 at the point where the linkages 52 are pivotally interconnected. As the neck guide engaging arm 60 is driving the first pivot guide 62 towards the center fixed point 66, the linkages 54 are compressed therefore driving the second pivot guide 72 towards the center fixed point 66 and upwards. As the second pivot guides 72 are driven upwards, the upper track 74 is also driven upwards. Affixed to the upper track 74 is a pin 76 which is disposed within a stop motion slot 78. Therefore, as the pin 76 moves within the stop motion slot 78, the movement of the pin 76 is restricted, thereby restricting the upper track 74 movement as well. Therefore, at a particular point, the linkages 54 can no longer move the second pivot member 72 any further due to the restrictiveness of the track 74 withheld by the pin 76. At this point, the row closing neck guides 32 can travel no further. The above described interaction allows the driving of the row closing neck guides 32 to be uncontrolled beyond the fact of simply being driven together. However, it is to be understood that the row closing neck guides 32 may also be driven by servo motors or other means to accomplish similar results.

With reference to FIGS. 3, 6, 7 and 8, the bottles 12 must be released from the row closing neck guides 32. Once the bottles 12 and the row closing neck guides 32 are in the first constricted pattern, the hoist 34 moves down the hoist tracks 37 to place the current tier 40 upon the previous tier 40 which is on the pallet 38. Once the present tier 40 is set upon the previous tier 40 of bottles 12, the bottles 12 must be released from the row closing neck guides 32. Each row closing neck guide 32 includes a first side 32a and a second side 32b which are interconnected through the first pivot guide 62 at a pivot point 79. Once the bottles 12 are placed upon the previous tier 40, the opening cylinder or piston 80 is actuated to press down an opening bar 82 onto the two sections 32a and 32b of the row closing neck guides 32 which terminate in an upper part in a first tab 84a and a second tab 84b. The tabs 84a and 84b cross one another so that the first tab 84a is over the second side 32b of the row closing neck guide 32 and the second tab 84b is over the first side 32a of the row closing guide 32. Therefore, when the opening bar 82 is pressed down, it engages the first and second tabs 84a and 84b forcing open the neck guide 32 in a scissor fashion where the first side 32a of the row closing neck guide 32 and the second 32b of the row closing neck guide 32 open as they rotate above the pivot point 78. Therefore, when each of the row closing neck guides 32 have been opened, the bottles 12 are released from the row closing neck guides 32 allowing the hoists 34 to again return to the top position 34a as illustrated in FIG. 4. After the opening bar 82 has disengaged the tabs 84a and 84b, a spring 86 biases the first and second sides 32a and 32b of the row closing neck guide 32 together thereby reclosing the row closing neck guides 32.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for packaging a plurality of containers, of the type having an engagement lip extending from an upper portion, the apparatus comprising:

a plurality of holding members each adapted to engage a plurality of containers and positionable from a first spaced apart position to a second adjacent position;

at least one track having a first end and a second end interconnecting said plurality of holding members; and a driving mechanism;

wherein said holding members ride in said at least one track forming a line and said driving mechanism engages at least one holding member at either end of the line to collapse said holding members towards an area between said first end and said second end such that said holding members are positioned in said second position in a nested relationship.

2. The apparatus of claim 1, wherein said plurality of holding members are collapsably interconnected with one another and each further engage said at least one track.

3. The apparatus of claim 2, further comprising a plurality of positioning members interconnecting said holding members, wherein each positioning member includes a first end and a second end.

4. The apparatus of claim 3, wherein said at least one track includes an upper track and a lower track, wherein each holding member engages said lower track and further pivotally engages the first end of one of said plurality of positioning members.

5. The apparatus of claim 4, wherein the second end of each of said plurality of said positioning members is pivotally interconnected with the second end of another positioning member and said second end further slideably engages said upper track.

6. The apparatus of claim 5, wherein said upper track limits the range of movement of said holding members through an interaction with said positioning members.

7. The apparatus of claim 6, wherein said upper track includes a stop-action slot to limit the motion of said upper track.

8. The apparatus of claim 1, further comprising an opening piston and a single opening bar to force open each of said holding members to disengage all of the plurality of containers at once.

9. A bottle handling system comprising:

a delivery system delivering a plurality of bottles including lips;

a row forming indexer, to form a plurality of rows with said plurality of bottles; and a hoist including:

a plurality of guide members, wherein said plurality of guide members each hold a selected plurality of said plurality of bottles a first distance apart in a bundle pattern; and a driving mechanism, wherein said driving mechanism drives said plurality of guide members to constrict said bundle pattern such that said plurality of bottles are a second distance apart in a nested relationship.

10. A bottle handling system comprising:

a delivery system delivering a plurality of bottles including lips;

a row forming indexer, to form a plurality of rows with said plurality of bottles; and a hoist including:

a plurality of guide members, wherein said plurality of guide members each hold a portion of said plurality of bottles a first distance apart in a bundled pattern;

a driving mechanism, wherein said driving mechanism drives said plurality of guide members to constrict said bundle pattern such that said plurality of bottles are a second distance apart in a nested relationship; and at least one track wherein said plurality of guide members are collapsibly interconnected with one another through said track;

wherein said driving mechanism drives said plurality of guide members along said track.

11. The apparatus of claim 10, further comprising a plurality of positioning members interconnecting said guide members, wherein each positioning member includes a first end and a second end.

12. The apparatus of claim 11, wherein said at least one track includes an upper track and a lower track generally parallel to said upper track, wherein each guide member engages said lower track and further pivotally engages the first end of one of said plurality of positioning members.

13. The apparatus of claim 12, wherein the second end of each of said plurality of said positioning members is pivotally interconnected with a second end of another positioning member and said second end further slideably engages said upper track.

14. The apparatus of claim 13, wherein said upper track limits the range of movement of said guide members through an interaction with said positioning members.

15. The apparatus of claim 14, wherein said upper track includes a stop-action slot to limit the motion of said upper track.

16. The apparatus of claim 10, further comprising an opening piston and an opening bar to force open said guide members to disengage the lips.

17. A method of packaging a plurality of containers of the type having an engagement lip, said method comprising the steps of:

A. providing a set of said containers in a neck guide;

B. operably engaging at least one track with said neck guide;

C. moving said set of containers along said track into a constricting device including said neck guide;

D. constricting said set of containers to form a constricted nested bundle;

E. transporting said constricted nested bundle while in said neck guide to a palletizing area; and F. stacking said constricted nested bundle on a pallet.

18. The method of claim 17, comprising the further step of re-squaring said constricted bundle once loaded on the pallet.

19. The method of claim 17, wherein said step of providing a set of said containers in a neck guide includes the step of transporting a plurality of said containers a distance in a second neck guide through a row indexer and forming a plurality of rows of said containers.

* * * * *